United States Patent [19]

English et al.

[11] 4,239,369

[45] Dec. 16, 1980

[54] CAMERA AND REFLECTOR HAVING OFFSET OPTICAL AND MECHANICAL AXES

[75] Inventors: George J. English, Reading; Robert E. Levin, South Hamilton, both of Mass.

[73] Assignee: GTE Products Corporation, Stamford, Conn.

[21] Appl. No.: 961,894

[22] Filed: Nov. 20, 1978

[51] Int. Cl.[3] .......................... G03B 15/03; F21V 7/06

[52] U.S. Cl. .................................... 362/348; 354/126; 362/16; 362/255; 362/297; 362/349

[58] Field of Search ............. 362/348, 3, 16, 346-349, 362/297-299, 302, 303, 255; 354/126, 288

[56] References Cited

U.S. PATENT DOCUMENTS

| | | | |
|---|---|---|---|
| 1,464,270 | 8/1923 | Remark | 362/302 |
| 1,670,837 | 5/1928 | Blackmore | 362/348 X |
| 1,821,733 | 9/1931 | Thibodeau | 362/349 |
| 1,902,860 | 3/1933 | Kay et al. | 362/348 X |
| 2,290,793 | 7/1942 | Alderman | 354/126 X |
| 3,687,030 | 8/1972 | Dine et al. | 362/16 X |
| 4,158,223 | 6/1979 | Walley et al. | 362/297 |
| 4,158,493 | 6/1979 | Fohl et al. | 362/6 |

*Primary Examiner*—J. V. Truhe
*Assistant Examiner*—Shelley Wade
*Attorney, Agent, or Firm*—Lawrence R. Fraley

[57] ABSTRACT

An open-ended reflector for being positioned within a camera to provide a controlled pattern of light on a rectangular subject field located at a distance, e.g., five feet, from the camera. The reflector includes three specular reflective surfaces and a fourth surface having a ribbed diffusing region thereon. These four surfaces are oriented in such a manner that the mechanical axis through the reflector's open end will be offset from the reflector's optical axis when viewed from in front of the reflector.

13 Claims, 5 Drawing Figures

CAMERA AND REFLECTOR HAVING OFFSET OPTICAL AND MECHANICAL AXES

CROSS-REFERENCE TO COPENDING APPLICATION

An application entitled "Flash Lamp Assembly Having Heat Responsive Indexing Members" was filed Mar. 6, 1978 and is listed in the Patent and Trademark Office under Ser. No. 883,453. Ser. No. 883,453 is now U.S. Pat. No. 4,158,493. The present application defines a reflector which is ideally suited for use within the camera described in U.S. Pat. No. 4,158,493 for receiving a sequentially-fed elongated flash lamp article in order that each of the article's individual flash lamps will be oriented therein during ignition of said lamps. It will be understood from the following description that the invention is also suitable for use within cameras having other types of light sources, including those of the popular xenon flash variety.

BACKGROUND OF THE INVENTION

The present invention relates to reflectors and particularly to fixed reflectors which are positioned within photographic cameras.

As previously mentioned, the present invention comprises a reflector which is particularly suited for use within the camera assembly defined in U.S. Pat. No. 4,158,493. The assembly, which utilizes an elongated, linear array of electrically fired flash lamps, assures facile loading and firing of the individual lamps within the body of the camera. The camera is also compact in design due to the elimination of the requirement for an externally mounted flash attachment. Other features of said assembly are described in U.S. Pat. No. 4,158,493. The reflector of the instant invention, which assures a controlled, forward pattern of light from each of the camera's lamps during ignition thereof within the reflector, will understandably add still further to the advantageous features of assemblies such as defined in U.S. Pat. No. 4,158,493.

It is believed, therefore, that a reflector capable of providing a controlled pattern of light from the light source within camera assemblies such as those described would constitute an advancement in the art.

OBJECTS AND SUMMARY OF THE INVENTION

It is a primary object of the instant invention to enhance the reflector art and particularly the art involving reflectors fixedly oriented within photographic cameras.

In accordance with one aspect of the invention, a reflector is provided which provides a controlled pattern of light on a planar subject field located an established distance from the camera. The reflector comprises a plurality of specular reflective surfaces and at least one surface having a diffusing region. These surfaces are arranged to define an open end of the reflector wherein the optical axis and the open end's mechanical axis are offset. This offset relationship assures the aforedescribed compact design requirement in addition to providing a substantially uniform pattern of light on the camera's subject field.

DETAILED DESCRIPTION OF THE PREFERRED EMBODIMENT

For a better understanding of the present invention together with other and further objects, advantages and capabilities thereof, reference is made to the following disclosure and appended claims in connection with the above-described drawings.

Figure 1:
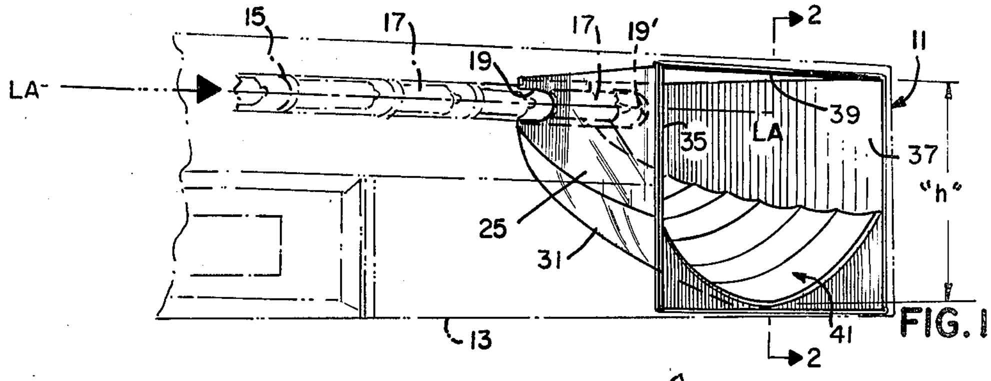
FIG. 1 is a perspective view of a reflector in accordance with a preferred embodiment of the invention.

With particular regard to FIG. 1, there is shown a reflector 11 in accordance with a preferred embodiment of the invention. Reflector 11 is adapted for being fixedly oriented with a photographic camera 13 (shown in phantom) to receive an elongated, linear array 15 of individual flash lamps 17. Each lamp 17 is sequentially fed reflector 11 through a pair of spaced and aligned slots 19 and 19' located within the sides of the reflector. Examples of both array 15 and camera 13 are described in the aforedescribed U.S. Pat. No. 4,154,493. When each lamp 17 is located within reflector 11, it is preferably fired electrically whereupon the highly intense flash is directed by reflector 11 in a forward manner (direction "F" in FIG. 2). Each lamp receives its activating pulse from a power source located within the camera in a manner such as shown in U.S. Pat. No. 4,154,493. The preferred flash lamps 17 for use in the instant invention are chemical flash lamps. By chemical is meant one including a light-transmitting glass envelope having a combustion-supporting atmosphere and a quantity of filamentary combustible material therein. As stated, the preferred lamps used in reflector 11 are electrically activated. Accordingly, a pair of conductive leads (not shown) project from the lamp's envelope to effect contact with the respective ignition means. Suitable examples of such lamps are described in U.S. Pat. Nos. 4,082,494 and 4,097,221, both of which are assigned to the assignee of the present invention.

It is also possible to use lamps of the percussively-ignitable variety such as shown in U.S. Pat. No. 3,535,063. Activation of each lamp would be achieved by suitable member capable of deforming the primer tube which extends therefrom. Such an activator is shown in U.S. Pat. No. 3,597,604. Both of the latter patents are also assigned to the assignee of the present invention.

It is even further possible to use arc discharge, e.g. xenon, flash lamps in reflector 11. Such lamps are well known in the camera electronic flash art and further description is not deemed necessary. A lamp of this type would be fixedly oriented within reflector 11 in the horizontal manner shown for lamp 17 in FIG. 1.

Figure 5:
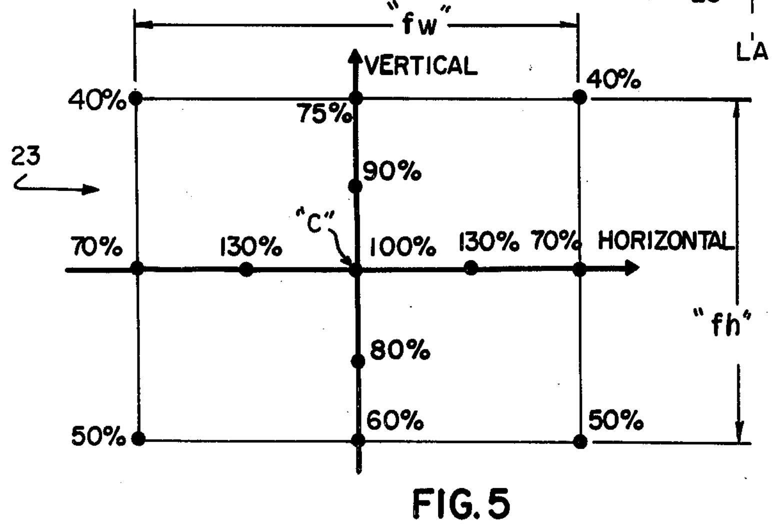
FIG. 5 represents one example of a field of illumination produced by the instant invention when a suitable light source is located therein, said field occupying a plane located an established distance from the invention.

Reflector 11 assures that camera 13 is able to maintain the compactness desired in many of today's cameras. In one embodiment, reflector 11 had an overall height (dimension "h") of about 3.18 centimeters, a width (dimension "w" in FIG. 3) of about 3.18 centimeters, and a depth (dimension "d") of about 2.54 centimeters. Most importantly, however, reflector 11 provides a controlled, substantially uniform pattern of light on a planar subject field located an established distance from the reflector (and therefore camera 13). By substantially uniform is meant a field of illumination wherein the level at the extreme edges is no less than about 40 percent of that at the field's center. One example of such a field of illumination is shown in FIG. 5. Field 23, rectangular in shape, is approximately 1.219 meters wide (dimension "fw") and 0.914 meters high (dimension "fh"), and is located about 1.524 meters from camera 13. Accordingly, field 23 has an aspect ratio of 4:3 (width:height). The numerical values shown at locations on the horizontal and vertical and at the four corners of field 23 represent the relative values of illumination at said locations in comparison to the level at the true center "c". As shown, the levels at the locations bisecting each side of the horizontal axis are approximately 130 percent of the level at center "c" while the levels at the upper and lower bisectors are 90 and 80 percent, respectively. In one example of the invention, the level of illumination at center "c" was 95 lumen seconds/foot$^2$.

Figure 2:
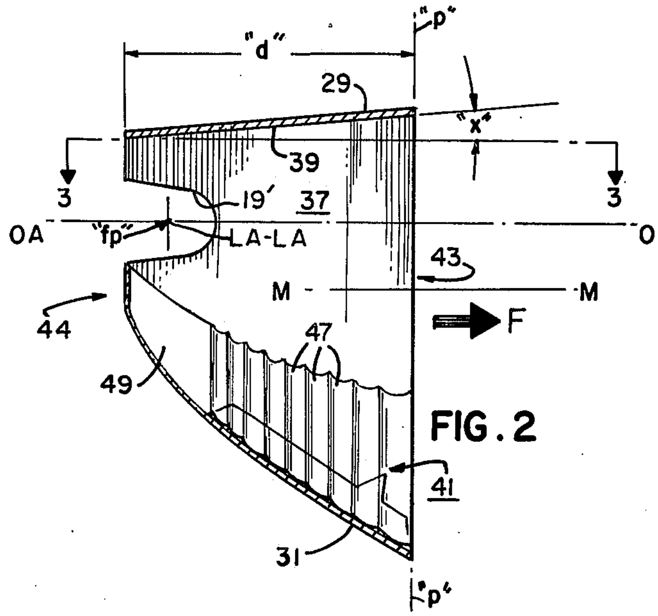
FIG. 2 is a side view, in section, of the reflector of FIG. 1 as taken along the line 2—2 in FIG. 1.
Figure 3:
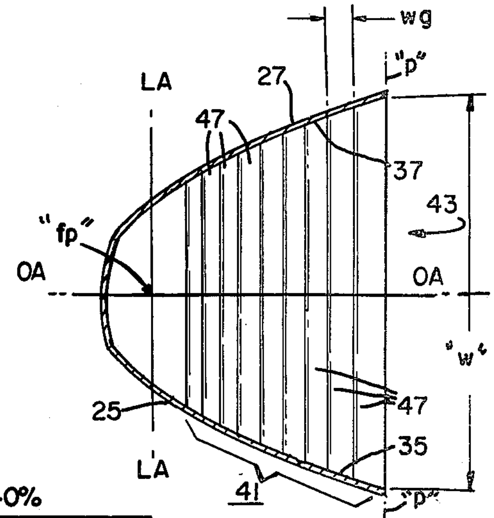
FIG. 3 is a top view, in section, of the reflector of FIG. 1 as taken along the line 3—3 in FIG. 2.

Field 23, being planar, is vertically oriented and is produced when reflector 11 is directed thereat such that the reflector's optical (or light projection) axis OA—OA passes through true center "c". Axis OA—OA is therefore horizontally oriented when camera 13 is in the preferred operating condition (also horizontal). With regard to the present invention, the optical axis of reflector 11 passes through the reflector's focal point "fp" and through the true center of the illuminated field 23. As shown in FIGS. 2 and 3, focal point ¢fp" is established within reflector 11 such that the longitudinal axis LA—LA of each flash lamp 17 (and also array 15) lies transverse therewith and passes therethrough. Longitudinal axis LA—LA is perpendicular to the drawing in FIG. 2. Array 15 and lamps 17 are removed for clarification purposes. It is understood that the longitudinal axis of flash lamps of the variety described above pass through the center of the lamp's elongated glass envelope. In the event that lamp 17 contains a filament, the lamp would be oriented within reflector 11 such that the filament would be centered on focal point "fp".

Reflector 11 includes a pair of side walls 25 and 27, a top wall 29, and a curved bottom wall 31. The internal surfaces 35, 37, and 39 of walls 25, 27, and 29, respectively, are specularly reflective while the internal surface of bottom wall 31 includes a light-diffusing region 41 located toward the forward portion of the reflector. With regard to the invention, by specular reflective is meant a type of reflection in which the angle between an incident ray of light and a normal to the surface will equal the angle between the normal and the respective reflected ray. Preferred materials for use as specular reflective surfaces includes mirrored glass, and polished and electroplated metals (e.g. gold, copper, aluminum). Both front and rear silvered glass mirrors may also be used. With added regard to the invention, by light-diffusing is meant a type of reflection in which each narrow solid angle pencil of incident rays is reflected over a significantly greater solid angle, but less than $2\pi$ steradians. Accordingly, an approximate uniform average surface brightness is provided at all viewing angles in an angular range greater than that which would be covered by a specular reflector of the same mean curvature as the said light-diffusing reflector.

The described internal surfaces are oriented to define an open end 43 for reflector 11 through which the directed flux will pass. In the embodiment shown, reflector 11 also includes a rear opening 44, primarily for adaptation purposes to accommodate the described elongated array 15 in U.S. Pat. No. 4,158,493. This array has an opaque base portion which will face rear opening 44 when the array is properly aligned within reflector 11. Accordingly, light emitted from the array's lamps will be blocked by this opaque base and prevented from striking a rear reflective surface in the event one were provided. It is understood, however, that the addition of such a surface is readily possible if different lamps or arrays of different configuration (e.g. cylindrical without an opaque base) were employed. One of the main features of the invention is that the internal surfaces of reflector 11 ae oriented such that the mechanical axis M—M of the open end 43 is offset from the reflector's optical axis. The mechanical axis is defined as an axis through the geometric mean of the forward facing end 43. When viewed from the front (from the right in FIG. 2) of reflector 11, the light source will thus be seen as lying above the mechanical axis. As shown in FIG. 2, therefore, axis M—M lies directly below the reflector's optical axis. In the invention, open end 43 lies in a vertical plane "p"—"p" as defined by the forward edges of walls 25, 27, 29, and 31. Accordingly, mechanical axis M—M is perpendicular to this vertical plane. It is preferred in the invention that the described optical and mechanical axes are parallel. In FIG. 3, mechanical axis M—M is not illustrated, as it lies directly below the reflector's optical axis and is therefore not visible to the drawing's viewer. It is also understood from the above that the mechanical axis, when extended, is also perpendicular to the lamp axis LA—LA and lies below said axis.

The overall configuration for reflector 11, which results in the described offsetting relationship between axes OA—OA and M—M, assures that the invention will be both compact and readily adaptable to placement within many of today's smaller cameras, such as shown in FIG. 1. With particular regard to the camera defined in U.S. Pat. No. 4,158,593, reflector 11 is particularly adapted to accommodate the described elongated lamp array 15 which, by design, passes through the upper, rear portion of the camera. Accordingly, reflector 11 is designed to meet certain geometric constraints while still maintaining photometric uniformity and efficiency.

As shown in FIG. 2, upper surface 39 is planar and is located at an angle ("x") with the horizontal optical axis OA—OA. Angle "x" is within the range of from about 5 to about 10 degrees. In one embodiment of the invention, angle "x" was 8 degrees. The function of reflective surface 39 is to direct a portion of the light forward and also to generate multiple reflections with the other internal reflective surfaces to thereby assure the desired uniformity on field 23. Upper surface 39 follows the configuration for side walls 25 and 27, as depicted in FIG. 3. As such, surfaces 25 and 27 are located on opposing sides of upper surface 39 and are contiguous thereto. Basically, walls 25 and 27 are each parabolic in shape and can be described as off-axis parabolas which have been tilted about focal point "fp" in order that each is inwardly (toward the center of reflector 11)

translated approximately one-fourth of the length of the desired light source. In the preferred embodiment of the invention, this distance is about 0.25 centimeters. As such, the focus points for the curvilinear surfaces 35 and 37 are each located on opposing sides of optical axis OA—OA a total of this described distance. The tilting is utilized to increase the levels of illumination at the respective side regions of field 23. That is, reflective surface 35 is tilted to increase the illumination level to the left of the field's vertical axis, particularly in the region shown as possessing 130 percent illumination. Similarly, surface 37 assures the illumination level for the corresponding area to the right of the field's vertical axis. In summary, the above positioning relationship permits beam cross-over and maintains the desired field shape. As shown in FIG. 1, surfaces 35 and 37 are perpendicular to upper surface 39. It is further understood from the above that surfaces 35 and 37 diverge toward open end 43.

Figure 4:
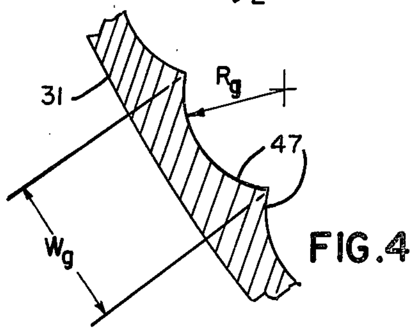
FIG. 4 is an enlarged view of a portion of the diffusing region for the reflector of FIG. 1.

Wall 32, shown in cross-section in FIG. 2, is of substantially parabolic configuration such that its focal point coincides with focal point "fp". Diffusing region 41, which follows this contour, comprises a plurality of individual, concave groove members 47 which extend from a point below and forward of focal point "fp" to the forward opening 43. Grooves 47 are each substantially circular in a plane perpendicular to optical axis OA—OA (and therefore parallel to plane "p"—"p"). In one embodiment of the invention, a total of nine grooves 47 were employed ranging in width (Wg in FIG. 4) from about 0.1524 cm. to about 0.3429 cm. Schedule A below represents the respective groove widths Wg and groove radii (Rg in FIG. 4) for the nine grooves 47 as shown in the drawings. In the schedule, groove #1 represents that one nearest the rear portion of reflector 11 while groove #9 represents the groove immediately adjacent front opening 43.

SCHEDULE A

| Groove | Groove Radius Rg (cm.) | Groove Width Wg (cm.) |
|---|---|---|
| 1 | 0.508 | 0.1524 |
| 2 | 0.508 | 0.1651 |
| 3 | 0.508 | 0.1651 |
| 4 | 0.508 | 0.2032 |
| 5 | 0.508 | 0.2413 |
| 6 | 0.635 | 0.2921 |
| 7 | 0.635 | 0.2921 |
| 8 | 0.792 | 0.3429 |
| 9 | 0.792 | 0.3048 |

Although the nine grooves 47 are shown, it is possible in the constraints defined to utilize from six to twelve such members.

Grooves 47 are arranged in region 41 in a parallel relationship, the function of each being to generate a controlled degree of spread of the directed light and thus contribute to the uniformity of subject field 23. As such, each groove is dependent on the focal length of the parabolic curve and the desired amount of spread over field 23. Grooves 47 spread each narrow bundle (or pencil) of incident light through a solid angle which is determined by Wg and Rg. Alternative forms of diffused surfaces (e.g. etched, sandblasted) would result in a loss of illumination from subject field 23 in comparison to that provided because such surfaces would provide an uncontrolled spread of light approaching $2\pi$ steradians.

Although grooves 47 are shown and described as being concave with respect to the interior of reflector 11, it is also possible to utilize grooves which are convex in shape. The widths and radii illustrated in Schedule A could also be used in this event. Still further, grooves 47 may be replaced with a predetermined array of peen elements. Examples of such elements for use within a reflector are described in U.S. Pat. No. 3,428,800, said patent assigned to the assignee of the present invention.

Wall 31 is shown in FIG. 2 as also including an internal specular reflective region 49 adjacent diffusing region 41 and extending therefrom to the rear opening 44. Region 49 is thus nearer optical axis OA—OA than region 41. The spread of the flux from region 49 is sufficient to cover the entirety of field 23 and provide necessary supplemental illumination thereto. Diffusion means such as grooves 47 are not required in this region due to the proximity of the respective light source.

Thus there has been shown and described a compact reflector which may be fixedly located within many of today's smaller (e.g. pocket) cameras to assure a controlled, substantially uniform field of illumination at a specified distance from the camera. The reflector is particularly suited for use within the camera assembly defined in U.S. Pat. No. 4,158,493.

While there have been shown and described what are at present considered the preferred embodiments of the invention, it will be obvious to those skilled in the art that various changes and modifications may be made therein without departing from the scope of the invention as defined by the appended claims.

What is claimed is:

1. A reflector for being fixedly oriented within a photographic camera to provide a controlled pattern of light from a light source located within said reflector on a planar subject field located an established distance from said camera, said reflector including an optical axis and comprising:

a plurality of internal specular reflective surfaces; and at least one internal surface having a diffusing region thereon, said specular reflective surfaces and said surface having said diffusing region thereon defining an open end within said reflector such that the mechanical axis of said open end and said optical axis of said reflector pass through said open end and are oriented therein in an offset relationship, said specular surfaces and said diffusing region directly reflecting light from said light source toward said subject field such that said field receives light from both specularly and diffusely reflective surfaces.

2. The reflector according to claim 1 wherein a first of said specular reflective surfaces is substantially planar and is positioned at a predetermined angle from said optical axis of said reflector.

3. The reflector according to claim 2 wherein said predetermined angle is within the range of from about 5 to 10 degrees.

4. The reflector according to claim 2 wherein the number of said internal specular reflective surfaces is at least three, a second and a third of said surfaces located on opposing sides of said first, planar specular reflective surface and contiguous thereto.

5. The reflector according to claim 4 wherein each of said second and third specular reflective surfaces is curvilinear, said second and third surfaces diverging toward said open end of said reflector.

6. The reflector according to claim 4 wherein each of said second and third specular reflective surfaces is perpendicular to said first, planar specular reflective surfaces.

7. The reflector according to claim 4 wherein said camera includes a flash lamp assembly sequentially movable therein and having a plurality of individual flash lamps, said reflector including first and second spaced-apart, aligned slots therein for having said flash lamp assembly pass therethrough during said sequential movement of said flash lamp assembly.

8. The reflector according to claim 7 wherein said first and second slots are located within said second and third internal specular reflective surfaces, respectively.

9. The reflector according to claim 1 wherein in cross-section said surface having said diffusing region thereon is of substantially parabolic configuration.

10. The reflector according to claim 9 wherein said surface having said diffusing region thereon further includes a specular reflective region adjacent said diffusing region, said specular reflective region located nearer said optical axis of said reflector than said diffusing region and directly reflecting light over the entirety of said subject field.

11. The reflector according to claim 9 wherein said diffusing region comprises a plurality of substantially parallel grooves within said internal surface, each of said grooves substantially circular in configuration in a plane perpendicular to said optical axis of said reflector.

12. The reflector according to claim 11 wherein the number of said grooves is within the range of from about 6 to about 12.

13. The reflector according to claim 1 wherein said open end permits light emitted by said light source to be directly projected toward said subject field when said light source is located within said reflector.

* * * * *